(12) United States Patent
Davis

(10) Patent No.: US 6,219,423 B1
(45) Date of Patent: *Apr. 17, 2001

(54) SYSTEM AND METHOD FOR DIGITALLY SIGNING A DIGITAL AGREEMENT BETWEEN REMOTELY LOCATED NODES

(75) Inventor: Derek L. Davis, Phoenix, AZ (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/678,360

(22) Filed: Jun. 26, 1996

Related U.S. Application Data

(63) Continuation of application No. 08/251,486, filed on Dec. 29, 1995.

(51) Int. Cl.[7] .............................. H04K 1/00; H04L 9/00; G06F 17/60
(52) U.S. Cl. .............................. 380/268; 705/37; 705/53; 705/67; 705/75
(58) Field of Search ...................... 380/25, 268; 364/225, 364/918; 395/218; 705/37, 53, 67, 75

(56) References Cited

U.S. PATENT DOCUMENTS

| | | |
|---|---|---|
| 3,806,874 | 4/1974 | Ehrat . |
| 4,092,524 | 5/1978 | Moreno . |
| 4,215,421 | 7/1980 | Giraud . |
| 4,271,482 | 6/1981 | Giraud . |
| 4,638,120 | 1/1987 | Herve . |
| 4,656,474 | 4/1987 | Mollier et al. . |
| 4,868,877 | 9/1989 | Fischer . |
| 4,881,264 | 11/1989 | Merkle . |
| 4,962,532 | 10/1990 | Kasiraj et al. . |
| 5,040,142 | 8/1991 | Mori et al. . |
| 5,144,659 | 9/1992 | Jones . |
| 5,224,160 | 6/1993 | Paulini et al. . |
| 5,289,540 | 2/1994 | Jones . |
| 5,465,299 | 11/1995 | Matsumoto et al. . |
| 5,473,692 | 12/1995 | Davis . |
| 5,479,509 | 12/1995 | Ugon . |
| 5,539,828 | 7/1996 | Davis . |
| 5,568,552 | 10/1996 | Davis . |
| 5,613,012 | 3/1997 | Hoffman et al. . |
| 5,615,269 * | 3/1997 | Micali ................................. 380/49 |
| 5,629,982 | 5/1997 | Micali . |
| 5,633,932 | 5/1997 | Davis et al. . |
| 5,666,420 | 9/1997 | Micali . |
| 5,724,425 | 3/1998 | Chang et al. . |
| 5,796,840 | 8/1998 | Davis . |
| 5,805,706 | 9/1998 | Davis . |
| 5,805,712 | 9/1998 | Davis . |

OTHER PUBLICATIONS

B. Schneier, Applied Cryptography, (1st Edition), 1994, John Wiley & Sons, Inc., pp. 34, 35, 99.*
Bruce Schneier; Applied Cryptography; 1994; John Wiley & Sons, Inc.; pp. 19–24.*
Applied Cryptography (*Protocols, Alogorithms and Source Code in C*), 2nd Edition, Bruce Schneier, 1996, pp. 101–124.

* cited by examiner

Primary Examiner—Stephen C. Buczinski
(74) Attorney, Agent, or Firm—Blakely, Sokoloff, Taylor & Zafman LLP

(57) ABSTRACT

A digital arbitration system comprising a server node and at least one signatory node coupled together through a communication link. Each of the signatory node(s) may be configured with a unique private key which is used to digitally sign a message, a hash value of an electronic document for example, and transmits the digitally signed message being a digital signature to the server node via the communication link. The server node determines whether the digital signatures have been received from at least one of the signatory node(s) and whether each of the digital signatures is valid. The server node then transmits all of the digital signatures to each of the signatory node(s), provided both conditions described have been met.

15 Claims, 6 Drawing Sheets

SYSTEM AND METHOD FOR DIGITALLY SIGNING A DIGITAL AGREEMENT BETWEEN REMOTELY LOCATED NODES

CROSS-REFERENCES TO RELATED APPLICATIONS

The named inventor of the present application has filed a number of United States Patent Applications entitled "An Apparatus And Method For Performing Secured Cryptographic Operations" (application Ser. No. 08/578,177, a Continuation of application Ser. No. 08/251,486, filed on Dec. 29, 1995), "A Method For Providing Secured Communications" (application Ser. No. 08/538,869, a Divisional of application Se. No. 08/251,486, filed on Oct. 4, 1995), "A Method For Providing A Roving Software License In A Hardware Agent-Based System" (U.S. Pat. No. 5,568,552). These applications are owned by the same assignee of the present Application.

BACKGROUND OF THE INVENTION

1. Field of the Invention

The present invention relates to the field of communications. More particularly, the present invention relates to a system and method for creating a remote digital agreement formulated through an execution procedure.

2. Description of Art Related to the Invention

Over hundreds of years, written agreements have been used as a vehicle for a variety of purposes, among which is to establish certainty and clarity in business, legal and other types of arrangements between two or more parties to the agreement. In general, one type of an agreement is a "contract", which is defined as a promise or set of promises between two or more parties by which the law allows the party or parties that abide by the terms of the contract to recover damages (e.g., monetary compensation) from the party or parties that breach the contract. Another type of agreement is a stipulation agreement used during litigation in which the parties agree to material facts not in dispute. Although there exists a wide variety of execution schemes, one type of scheme is where the parties to the contract negotiate "at arm's length" to formulate terms of the written agreement (e.g., contract) which are mutually agreeable to the parties.

After agreeing to the terms of the written agreement, the parties select an execution procedure for signing the agreement. The nature of that execution procedure may depend on the importance of the agreement, past dealings between the parties, and many other factors. The execution procedure may be overseen by a "non-signing party" acting as an arbitrator (referred to as "independently-arbitrated agreement execution"), or by the parties themselves in a localized setting (referred to as "mutually-arbitrated agreement execution").

Referring to FIG. 1, mutually-arbitrated agreement execution is generally preferred when all of the parties or the signatories of the agreement 110 can meet at a selected location to execute one or more printed copies of the agreement 120. This guarantees that each party possesses an original copy of the agreement upon adjournment of the meeting. Such meetings are costly and difficult to arrange, especially when the agreement involves a large number of parties.

In the event that the simultaneous assembly of all parties is not feasible or undesirable, an alternative approach may include an independently-arbitrated execution procedure utilizing human arbitration as shown in FIG. 2. For this execution procedure, each signatory $\mathbf{110}_1$ and $\mathbf{110}_2$ separately executes one or more copies of the agreement and provides the partially-signed agreements $\mathbf{130}_1$ and $\mathbf{130}_2$ to the arbitrator 140 (e.g., a third party who is not a signatory of the agreement). When receiving partially-signed agreements $\mathbf{130}_1$ and $\mathbf{130}_2$ from all of the parties, the arbitrator 140 provides a copy of the fully-signed agreement $\mathbf{150}_1$ and $\mathbf{150}_2$ back to each signatory $\mathbf{110}_1$ and $\mathbf{110}_2$. The disadvantage associated with this execution procedure is that it is entirely dependent on the integrity of the arbitrator 140 to properly follow a static procedure. However, it is apparent that it is quite difficult and costly, especially for parties situated in other countries and/or in different states, to check the integrity of the arbitrator. Likewise, the cost of the arbitration service itself and the time delay in execution of the written agreement may be unacceptable.

Referring now to FIG. 3, another execution procedure (referred to as "non-arbitrated execution") is applicable when the written agreement is of lesser value or when a sufficient degree of trust exists between the "an" signatories ("n" being a whole number, $n \geqq 3$ in this example). One signatory $\mathbf{110}_1$ starts the execution process by signing the agreement and forwarding the partially-signed agreement $\mathbf{160}_1$ on to the next signatory $\mathbf{110}_2$. As each successive signatory receives the partially-signed agreement, it applies its own signature and forwards it to another signatory until the agreement is fully executed. The last signatory $\mathbf{110}_n$ has the responsibility to return copies of the fully-executed agreement $\mathbf{170}_1, \mathbf{170}_2, \ldots \mathbf{170}_{n-1}$ to all signatories, as did the arbitrator in FIG. 2. This method has the advantage of cost reduction, since the signatories need not be assembled nor is an arbitration fee incurred. The significant disadvantage is that the success of the process is dependent on the integrity of the last signatory who is a party to the agreement. The last signatory is not compelled to redistribute copies of the signed agreement, especially if a business advantage can be gained by being in possession of the only signed agreement.

Recently, a number of states have passed legislation that recognizes private key-based digital signature as legally binding a party to the terms of a digital agreement. A "digital agreement" is an electronic document representing an agreement that is to be digitally signed by all parties to the agreement through their respective private keys. Like written agreements, digital agreements may be executed through independent-arbitration, mutual-arbitration, or non-arbitration execution procedures. However, it is evident that cost and time saving advantages offered by digital agreements would be greatly reduced by following an independently-arbitrated execution procedure or a mutually-arbitrated execution procedure. Thus, it has been desirable for digital agreements to undergo non-arbitrated execution as shown in FIG. 4.

Referring to FIG. 4, after negotiating the terms of the digital agreement 205, a first party at a first node 200 (e.g., computer) normally signs the digital agreement 205 by (i) applying a hash algorithm (e.g., "MD5" algorithm developed by RSA Data Security of Redwood City, Calif.) to the digital agreement 205 to obtain its unique hash value 210, and (ii) encrypting the hash value 210 with an asymmetric cryptographic algorithm (e.g., RSA algorithm) under its private key ("PrKA") to produce a "first digital signature" 215. It is contemplated that such hashing is not necessary, but may be used to reduce the amount of data thereby preserving bandwidth during transmission and memory during storage. Thereafter, at least the first digital signature 215 is transferred to another party at a second node 220. Additional information may be transferred in combination with the first digital signature 215 such as the digital agreement 205 or its hash value 210. Optionally, some or all of this information may be protected during transfer (for privacy purposes) by encrypting with a previously chosen symmetric key.

The execution procedure can be continued in a serial manner by the party at the second node 220 creating its own digital signature 230 (e.g., in this embodiment, hash value 225 encrypted under a private key "PrKB" of the party at the second node 220). Thereafter, an aggregate signature set 235 (including the first and second digital signatures 215 and 230 and possibly additional information) to the next party of the agreement. This procedure may continue for an arbitrary number of parties with the final party at node 240 being responsible for returning the fully-signed digital agreement 250 (i.e., in this case, a hash value of the agreement individually encrypted with the private keys of each party to the digital agreement) to all of the other signatories.

Referring now to FIG. 5, if the first digital signature 215 is created by encrypting the hash value 210 under the private key PrKA, the first digital signature 215 may be validated by any party with access to the hash value 210 or the original digital agreement 205. Such validation is accomplished by decrypting the first digital signature 215 with a well-known public key ("PuKA") associated with the first party at node 200 to produce a resultant value 260. Thereafter, the resultant value 260 is compared to a previously obtained or computed hash value 210 of the digital agreement 205 as shown. If the resultant value 260 and the hash value 210 are identical, the first party is deemed to have signed the digital agreement. This procedure may be performed to validate the signature of any of the signatories.

As realized by viewing FIGS. 4 and 5, this non-arbitrated execution procedure for digital agreement clearly poses a risk to all signatories, except the final signatory 240 in the event that the final signatory 240 fails to return a copy of the fully-signed digital agreement to each of the other signatories 200 and 220. For example, if the agreement requires a first signatory to make a monetary payment, to supply goods, or to provide services to the final signatory and the first signatory has not yet received the fully-signed digital agreement from the final signatory, the first signatory risks breaching the agreement if it does not act in accordance with the terms of the agreement. Moreover, if the final party later decides to not abide by the terms of the agreement, the first party may have only limited legal recourse to retrieve its monetary payment or return of its goods. This is due to the fact that the first party only has a copy of a partially-signed digital agreement, not the fully-signed agreement which may have been erased, destroyed, or never signed by the final party. Regardless of the outcome, this non-arbitrated execution procedure allows the business arrangement to be controlled by the final party signing the digital agreement by the accidental or intentional failure to return the fully-signed digital agreement.

In a recent cryptography publication by Bruce Schneier entitled *"Applied Cryptography"* (2nd Edition), an overview is presented of protocols for non-arbitrated, "simultaneous" execution of digital contracts, attempting to address the issue of one signatory to a digital contracts having an advantage over another. These are very tedious, communication intensive protocols, based on each signatory taking a great number of steps in the signature process to build up complete signatures from the other signatories. However, this publication fails to provide a simple protocol for arbitrated execution of digital agreements and a protocol that does not exclusively depend on the integrity of the arbitrator.

Therefore, it would be desirous to create a system and method for reducing the risks associated with execution of digital agreements, while maintaining the cost, time, and convenience advantages of remote execution.

SUMMARY OF THE INVENTION

A digital arbitration system comprising an arbitration node and one or more signatory node(s) coupled together through a communication link. Each of the signatory node(s) may include a unique private key which is used to digitally sign a message, forming a digital signature, and transmit the digital signature over the communication link to the server node. Alternatively, if only one signatory node is used, each party's signature may be created within a removable personal token supplied by that party. The server node transmits an acknowledge signal or the digital signatures from the parties to each of these parties upon receiving all of the digital signatures and determining that each of the digital signatures is valid.

BRIEF DESCRIPTION OF THE DRAWINGS

The features and advantages of the present invention will become apparent from the following detailed description of the present invention in which.

DESCRIPTION OF THE PREFERRED EMBODIMENT

The present invention relates to a system and method for digitally signing a digital agreement between remotely located nodes in a manner which precludes fraudulent withholding of the fully-signed digital agreement in an effort to gain an unfair advantage over a contractual business arrangement. In the following description, numerous details are set forth such as certain configurations of a digital arbitration system in order to provide a thorough understanding of the present invention. It will be obvious, however, to one skilled in the art that other system configurations may be utilized while still practicing the present invention.

In the detailed description, a number of cryptography-related terms are frequently used to describe certain characteristics or qualities which is defined herein. A "key" is an encoding and/or decoding parameter being a sequence of binary data that is used by cryptographic algorithms (e.g., Rivest, Shamir and Adleman "RSA", Digital Signature Standard "DSS", Elliptic Curve, etc.) as public and private key pairs, or used by cryptographic algorithms (e.g., Data Encryption Standard "DES") as a selected "session" key shared in confidence between the two parties. A "message" is digital information, for example, an electronic document or a hash value of one or more electronic document(s) if hashing is utilized. A "digital signature" is digital information resulting from information encrypted with a private key of a party. Such information may include, but is not limited to, an electronic document, a hash value and the like. This digital signing process allows a recipient of the digital signature to verify the identity, of the party sending the digital signature. This may be accomplished by decrypting the digital signature with a public key corresponding to the private key of the signing party. A "certificate" is defined as digital information resulting from information, typically a public key associated with the holder of the certificate, encrypted with a private key held by another entity (e.g., manufacturer, arbitration service provider "operator" responsible for the arbitration system, trade association, governmental entity and the like).

Figure 6:
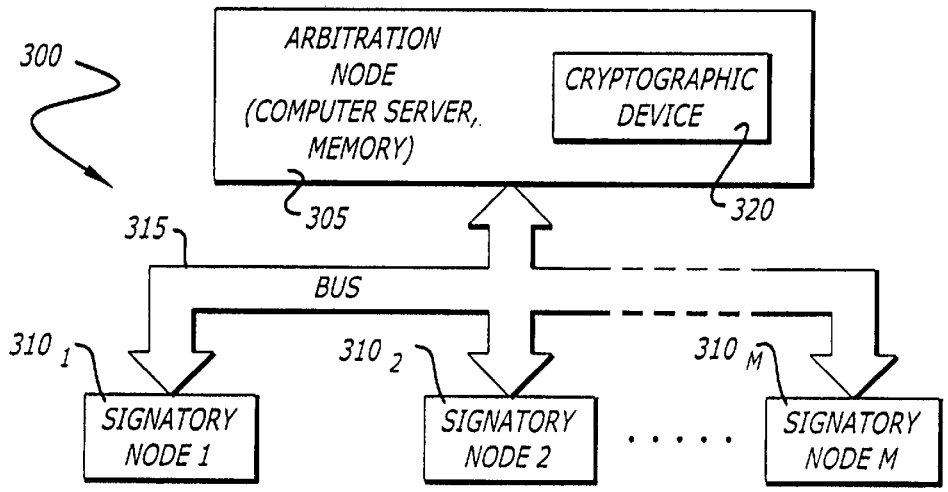
FIG. 6 is a block diagram of a first embodiment of a digital arbitration system.

Referring to FIG. 6, a first embodiment of a digital arbitration system is illustrated. The digital arbitration system 300 comprises an arbitration node 305 such as, for example, a computer functioning as a server. The arbitration node 305 is coupled to one or more signatory nodes $310_1$-$310_m$ ("m"≧1 and a whole number) through a communication link 315. The signatory nodes $310_1$-$310_m$ may include any device capable of communicating with the communication link 315 and producing digital signatures. Examples of such devices include, but are not limited to, personal computers, servers, mainframes, workstations, PDAs (personal digital assistants), telephones, etc.

The arbitration node 305 contains a cryptographic device 320 that is capable of operating as a digital arbitrator by collecting digital signatures produced from signatory nodes $310_1$-$310_m$. The signatory nodes $310_1$-$310_m$ may be owned or controlled by each party of a digital agreement having nodes $310_1$-$310_m$, or alternatively one signatory node may be controlled with an ability to receive personal tokens (e.g., circuitry configured to securely store one's private key) having a private key associated with the party securely implemented thereon. Thus, one signatory node placed at a centralized location may be used by the parties of the digital agreement.

Thereafter, copies of all of these digital signatures (collectively representing the fully-signed digital agreement) may be returned to each of the parties after certain conditions have been met. It is contemplated that the fully-signed digital agreement may be stored in the arbitration node 305 with acknowledgment signals sent to each of the parties that agreement has been signed by all parties. Copies of the agreement may be requested by any of the signatories or may be sent after signing is completed.

The communication link 315 may be accessible to the public at large (e.g., Internet) or accessible to a lesser number of individuals as in a local area network ("LAN") or a wide area network ("WAN"). This communication link 315 provides bi-directional communications between the arbitration node 305 and the signatory nodes $310_1$-$310_m$ representing one or more parties to the digital agreement so that the arbitration node 305 transmits and receives information to produce a legally enforceable digital agreement. The procedure undertaken by the arbitration node 305 for exchanging information is discussed below in detail.

Figure 7:
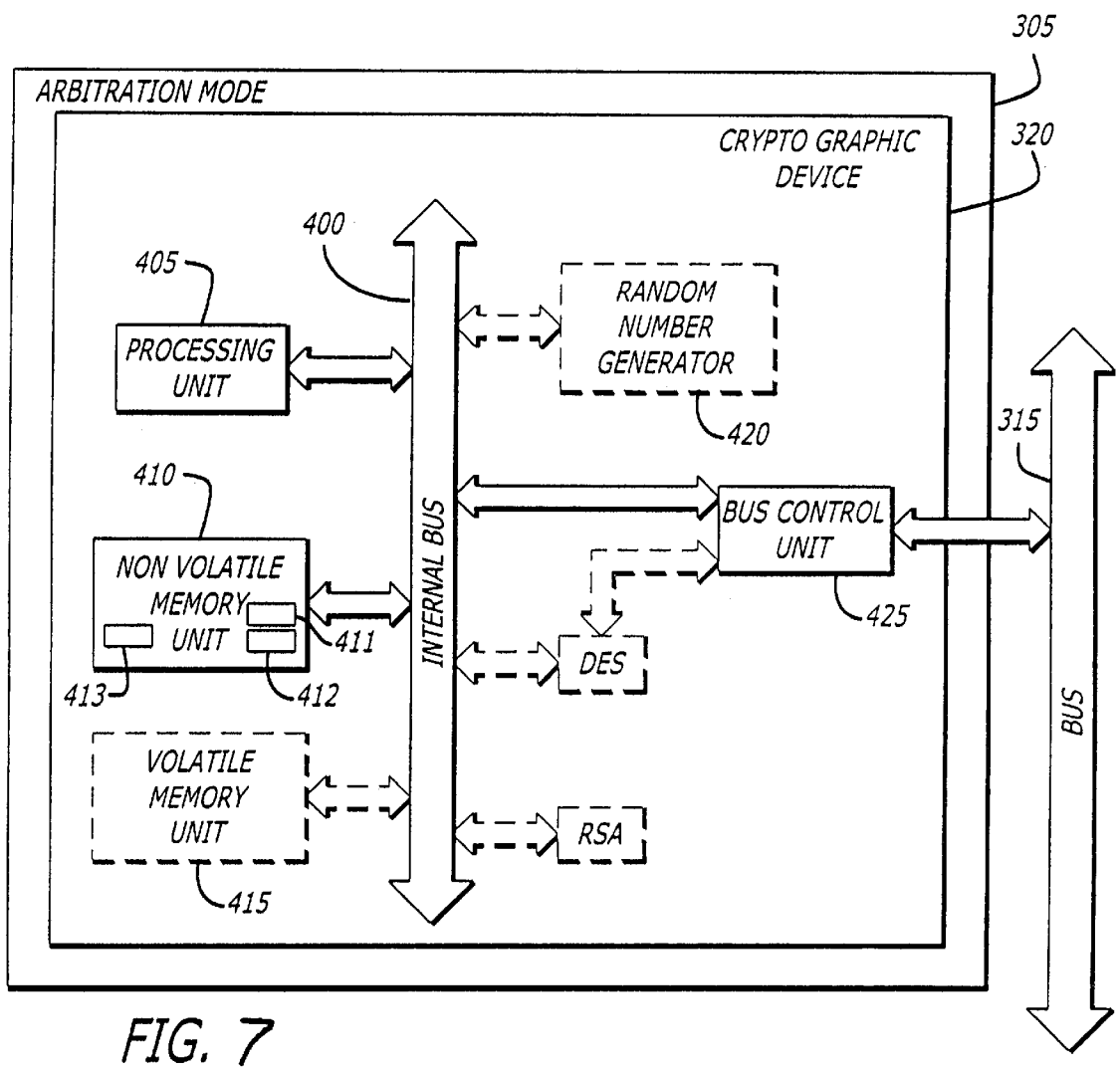
FIG. 7 is a block diagram of an embodiment of the cryptographic device implemented within the arbitration node of the digital arbitration system of FIG. 6.

Referring to FIG. 7, the cryptographic device 320 comprises an internal bus 400 interconnecting a processing unit 405, non-volatile memory unit 410, an optional volatile memory unit 415 (as denoted by dashed lines), an optional random number generator 420 (as denoted by dashed lines) and a bus control unit 425. The non-volatile memory unit 405 contains at least the public/private key pair 411 and 412 uniquely associated with the cryptographic device 400. It is contemplated that as arbitration software 413 may be contained within the non-volatile memory unit 405 or may be stored outside the cryptographic device 320, assuming such software is cryptographically protected. When in operation, the arbitration software 413 performs one or more arbitration protocols. The bus control unit 425 controls data transmission between the cryptographic device 400 and the communication link 315, establishing communications with any one of the "m" signatory nodes remotely located from the arbitration node 305.

Optimally, the volatile memory unit 410 may be utilized as temporary storage by the processing unit 405 during execution of arbitration software 413. The random number generator 420 may be used in the initial generation of the public/private key pair 411 and 412 contained in the non-volatile memory unit 410. It is desirable to implement the random number generator 420 to guarantee that a private key of a unique public/private key pair has not been exposed in readable form outside the cryptographic device 320. Also, the cryptographic engine hardware represented by symmetric (e.g., DES-based) and asymmetric (e.g. RSA-based) encryption/decryption units may be implemented, as indicated by dashed lines, to assist in cryptographic operations.

It is contemplated, however, that the cryptographic device 320 may be implemented in a number of alternative embodiments. For example, the cryptographic device may be implemented with discrete logic on a printed circuit board, or implemented within a chip set operating in cooperation with a host processor There exist many embodiments which, although slightly different in design, do not deviate from the spirit and scope of the invention. An example of such an alternative embodiment is illustrated in FIG. 8.

Figure 8:
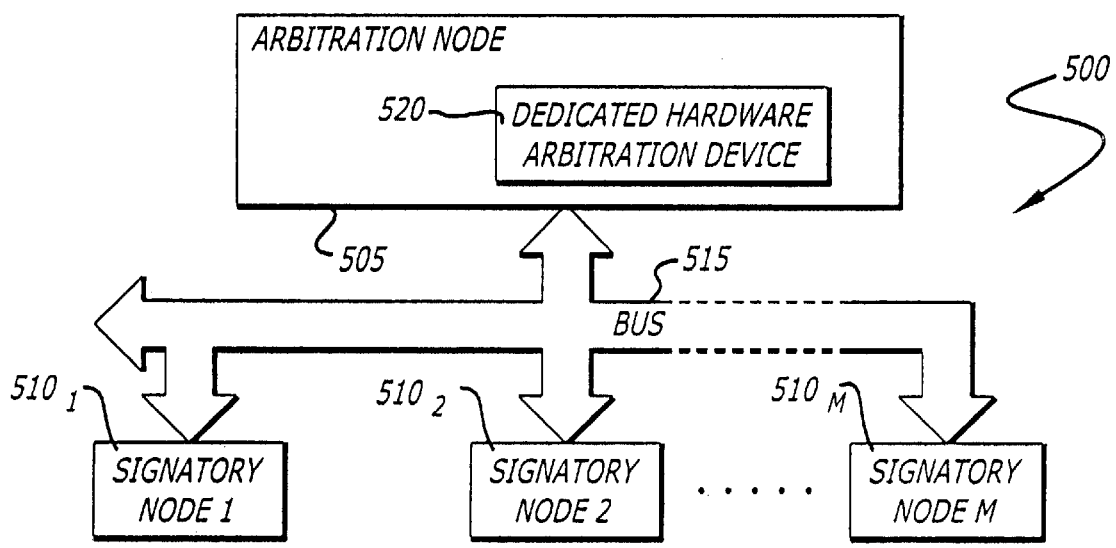
FIG. 8 is a block diagram of a second embodiment of the digital arbitration system.

Referring to FIG. 8, a second embodiment of the digital arbitration system 500 is illustrated in which the collective cryptographic operations are performed by the arbitration node 505. In contrast to the description of FIGS. 6–7, the arbitration node 505 does not employ the general purpose cryptographic device. Instead, the arbitration node 505 may be implemented with hardware dedicated to exclusively handle cryptographic arbitration operations.

As shown, the digital arbitration system 500 comprises the arbitration node 505 coupled to a number of signatory nodes $510_1$-$510_n$ through a communication link 515 (e.g., Internet, LAN, WAN, etc.). The arbitration node 505 contains a dedicated hardware arbitration device 520 (e.g., programmable logic devices, state machines, etc.) that primarily performs arbitration functions without being implemented with other general capabilities. The advantage of this type of embodiment is that it may have cost advantages over other embodiments. Once authentication of the dedicated hardware arbitration device 520 is performed (as detailed in following sections), no further authentication is required since the functionality of the arbitration node 505 is not easily modifiable due to its fixed or static hardware implementation.

Figure 9:
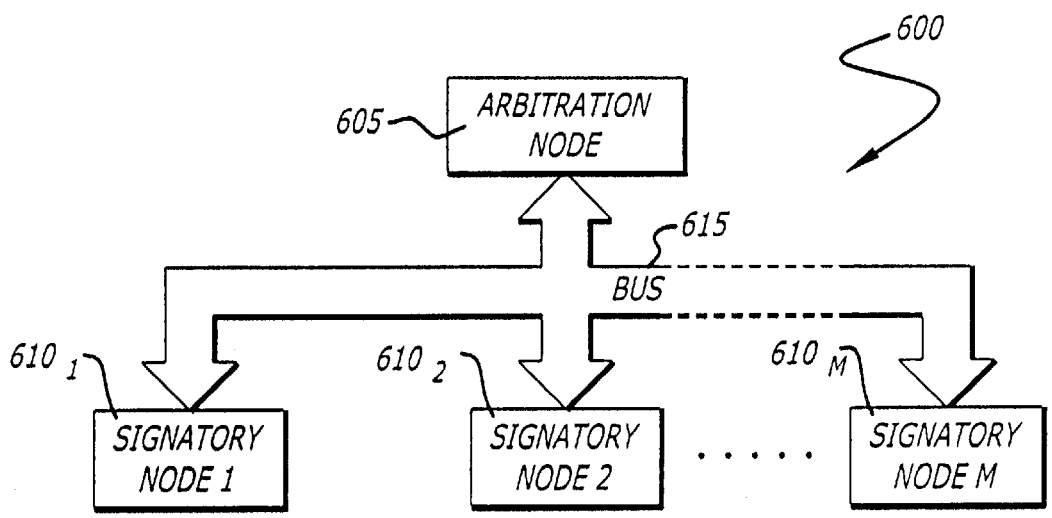
FIG. 9 is a block diagram of a third embodiment of the digital arbitration system.
Figure 10:
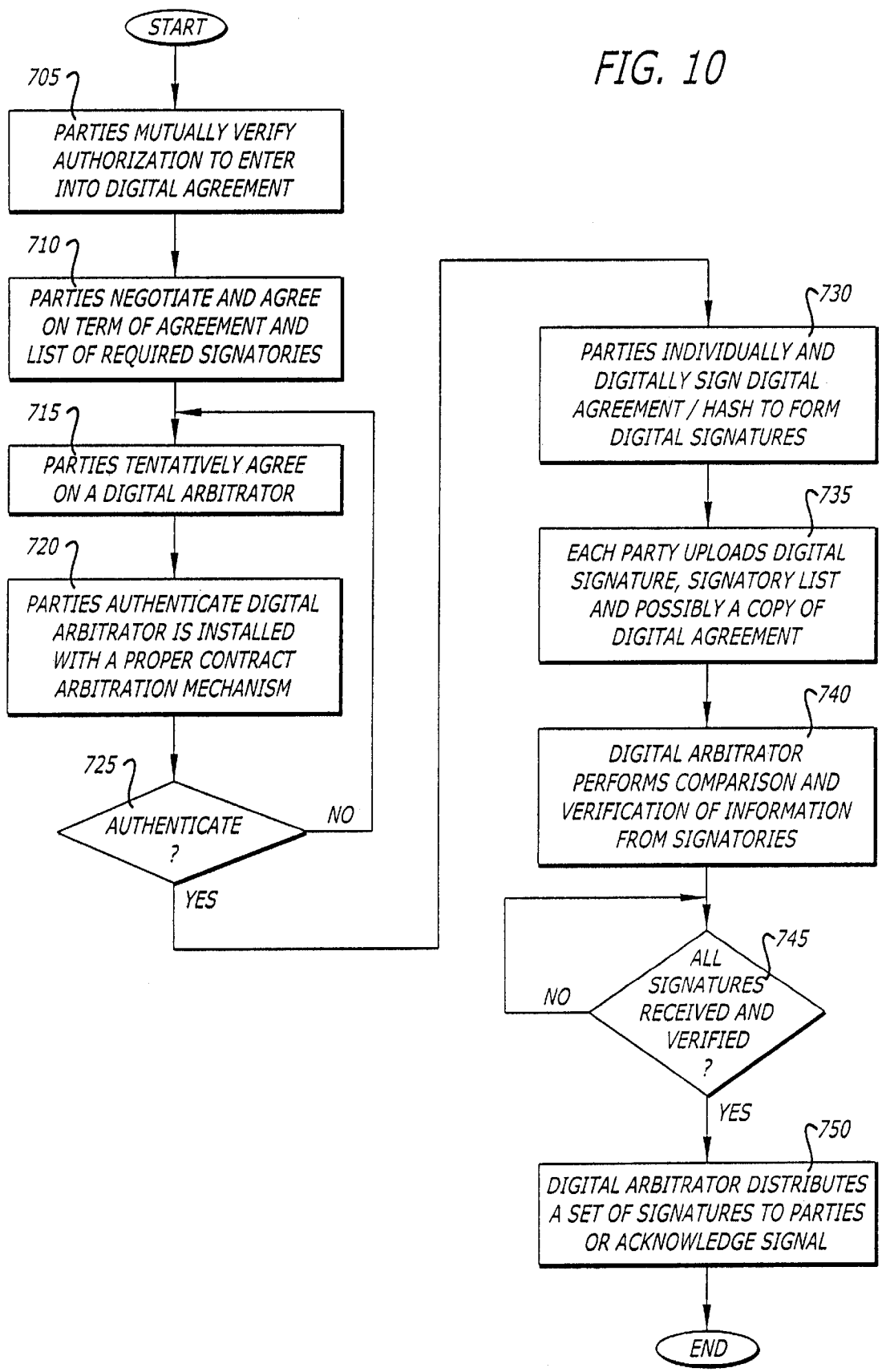
FIG. 10 is a flowchart illustrating the method of operations of the digital arbitration system of FIGS. 6, 8 and 9.

Referring to FIG. 9, a third embodiment of the digital arbitration system is illustrated in which the collective cryptographic operations are performed by a computer at a platform level (e.g., host processor, memory, etc.), not by a specific cryptographic device as described in FIGS. 7 and 8. The digital arbitration system 600 comprises the arbitration node 605 coupled to a number of signatory nodes $610_1$–$610_n$, through a communications link 615 (e.g., Internet, LAN, WAN, etc.). The arbitration node 605 is configured with arbitration software stored in memory (e.g., Random Access Memory "RAM", various types of Read Only Memory "ROM", flash memory and the like). The arbitration software is coded to produce similar functionality to that provided the cryptographic device, as shown in FIG. 10 and discussed below, when the host processor is executing instructions associated with the code. However, this implementation does not provide an ability to remotely authenticate the arbitration software implemented within the arbitration node 605 to guarantee its operation in a manner designated by the parties. Rather, the parties need to rely on the integrity and reputation of the owner or controller of the arbitration node 605.

Referring now to FIG. 10, the operations of the arbitration node implemented with one of the three embodiments of FIGS. 6, 8 and 9 to produce a fully-signed digital agreement are shown. First, in Step 705, the parties can mutually verify that each party is authorized to enter into the digital agreement. This can be accomplished verbally over the phone or, when dealing with business entities, by exchanging a digital certificate signed by a private key ("PrKTA") of a trusted authority (e.g., a partner or officer of the business, security office, etc.). The public key of the trusted authority ("PuKTA") should be widely available or verifiable through additional digital certificates or a digital certificate chain. Then, the parties negotiate the terms and wording of the digital agreement and specify the required signatories, including their public keys (Step 710). Next, the parties seek out and tentatively agree on a digital arbitrator, such as those shown in FIGS. 6,8 and 9 (Step 715). Upon agreeing on a digital arbitrator as shown in FIGS. 6 and 8, the parties check whether the digital arbitrator is implemented with an appropriate and acceptable arbitration mechanism. Otherwise, for a digital arbitrator utilizing only arbitration software as in FIG. 9, authentication of the arbitration mechanism is not performed, but rather of the owner or operator of the arbitration node. Thus, reliance is placed on the reputation of the owner or controller of the arbitration node (Steps 710–725).

More specifically, in the event that the arbitration node employs a cryptographic device having either a dedicated arbitration functionality as shown in FIG. 8 or general cryptographic functionality configured for arbitration (e.g. via software or firmware) as shown in FIGS. 6–7, authentication of the cryptographic device may be performed by a number of authentication procedures. One authentication procedure is by at least one of the parties requesting the arbitration node's (or cryptographic device's) public key ("PuKARB") and its manufacturer's certificate. Normally, the manufacturer's certificate is a message indicating that the arbitration node was manufactured by a certain company. Both the manufacturer's certificate and the public key are encrypted with a private key of a reputable manufacturer or trusted authority (e.g., a trade association, governmental entity, etc.) whose public key is widely disseminated. Thus, the parties can obtain PuKARB and send a challenge message to the arbitration node requesting a response to the message, this requested response being the message encrypted with the private key ("PrKARB") of the arbitration node. If the party can read the response by decrypting it with PuKARB, the arbitration node has been authenticated to be the device that the parties have sought.

If a general purpose cryptographic device configured for arbitration via software or firmware is employed within the authentication node of the arbitration system as in FIGS. 6–7, an additional authentication operation may be performed to ensure that an acceptable version of such firmware/software is installed. This authentication operation consists of querying the previously authenticated cryptographic device for details of its configuration. Based on the authenticity and known functionality of the cryptographic device and its firmware/software, a determination is made as to the acceptability of the installed arbitration protocol.

If the arbitration functionality is implemented as software running on the arbitration node under the control of an arbitration service provider, alternative methods of authenticating both the node and its configuration may be required. For example, one technique is to authenticate the node using a "Challenge-Response" authentication technique. Normally, the Challenge-Response authentication technique involves at least one of the parties sending a message requesting an "operator" certificate from the node. The "operator" certificate includes a message indicating that the node is under the control of the arbitration service provider and a public key of the node. Both the message and the public key of the node are encrypted with a private key of the arbitration service provider. The message and public key of the node can be obtained by decrypting the operator certificate with the public key of the arbitration service provider. Thus, authentication of the arbitration node is implicit depending on the reputation of the arbitration service provider who may be legally responsible for the operations of the arbitration node.

Of course, the highest degree of overall execution security and integrity is achieved when each party of the agreement performs these authentication operations and does so in an independent fashion. If the arbitrator authentication cannot be completed, a new digital arbitrator is selected by returning to Step 715.

In Step 730, each signatory digitally signs the digital agreement by encrypting a hash value of the digital agreement or the digital agreement itself (if hashing is not desired) with its private key. This digital signature, along with a signatory list and preferably, although not required, a copy of both the digital agreement or an equally acceptable alternative representation (e.g. hash value of the digital agreement), is then transferred to the digital arbitrator. This communication to the digital arbitrator is confidential, such as being protected through standard cryptographic means, typically by encrypting at least the digital signature with a temporary session key shared between the signatory and the digital arbitrator. This prevents the illicit capture of the digital signature by antagonistic parties, for use prior to the availability of the fully signed digital agreement from the digital arbitrator.

Figure 1:
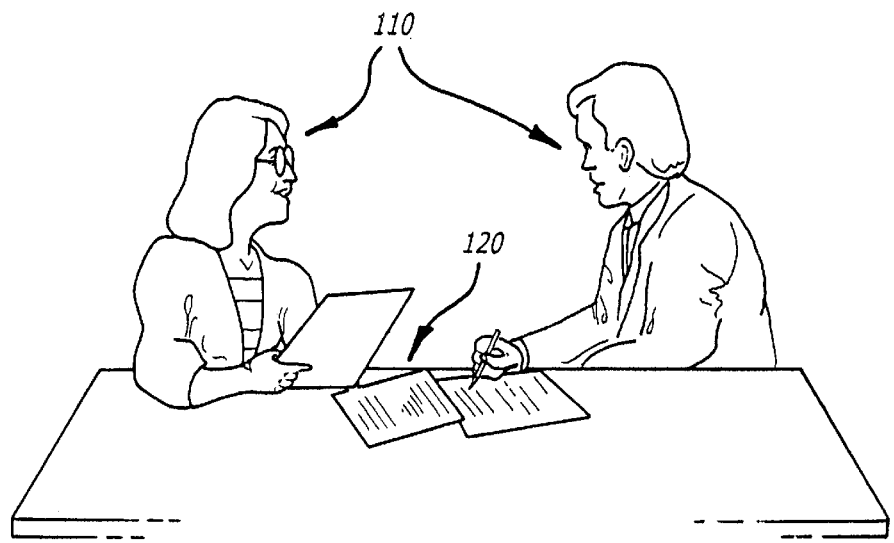
FIG. 1 is an illustrative embodiment of a face-to-face meeting of two signatories of an agreement following a mutually-arbitrated agreement execution procedure.
Figure 2:
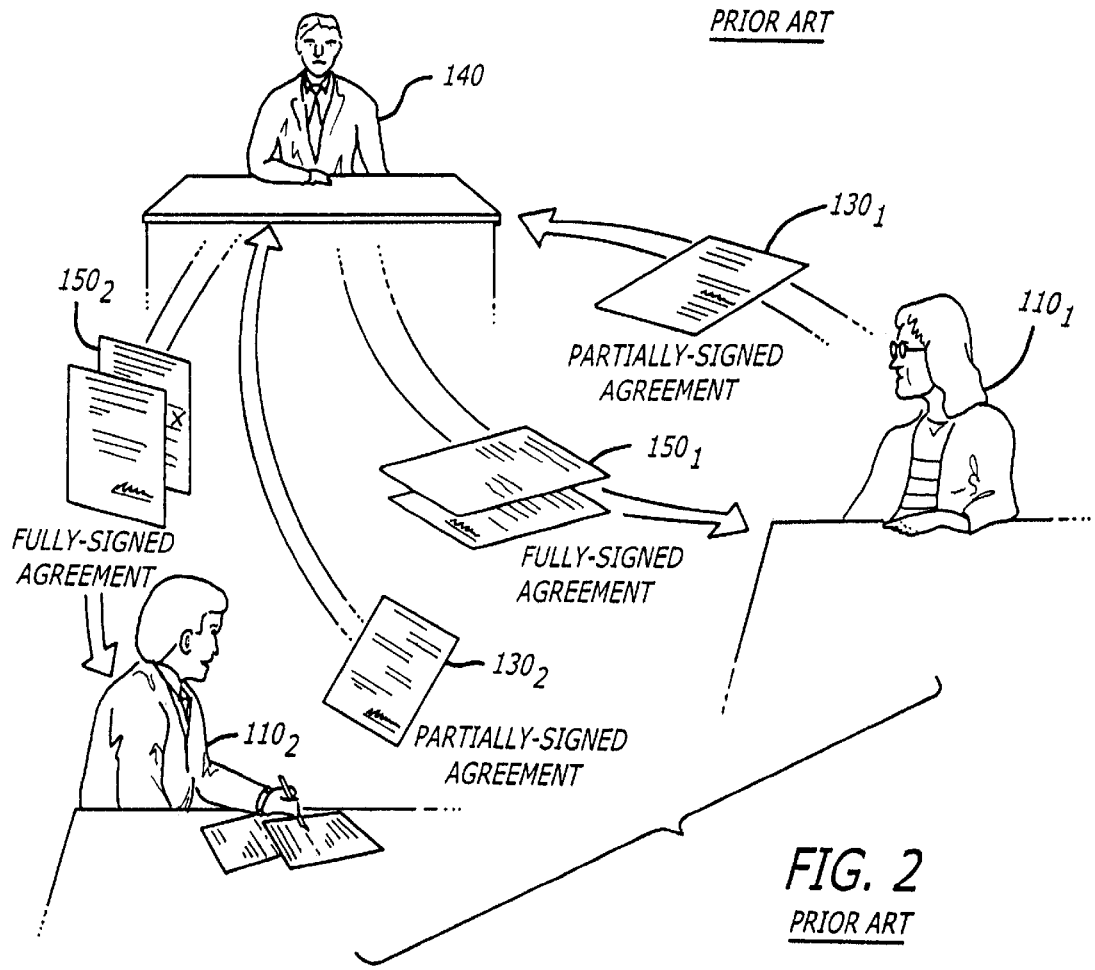
FIG. 2 is an illustrative embodiment of a non-signing human arbitrator receiving partially signed agreements from signatories of the agreement and returning fully signed agreements in accordance with an independently-arbitrated agreement execution procedure.
Figure 3:
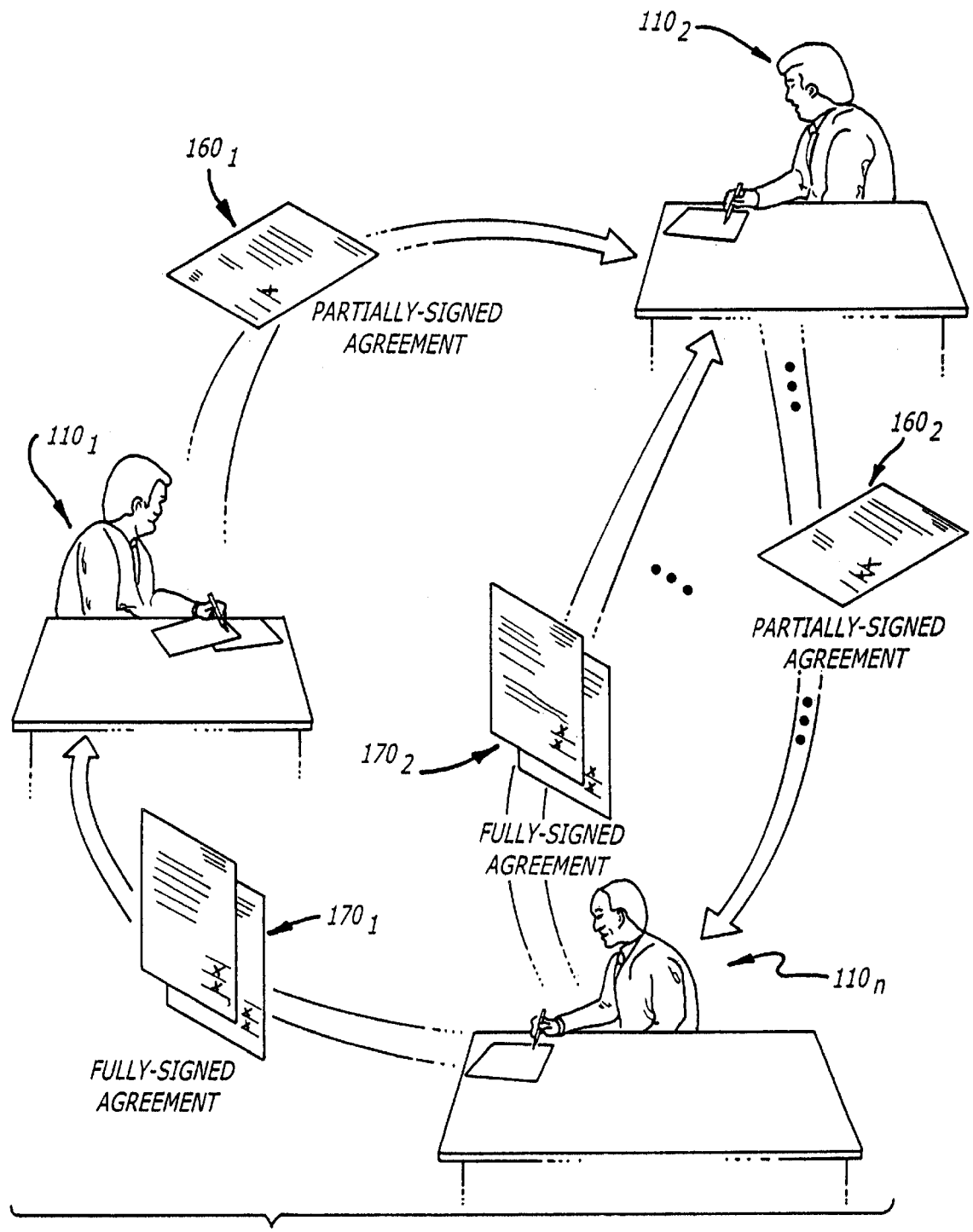
FIG. 3 is an embodiment illustrating the normal operations undertaken by a non-arbitrated agreement execution procedure.
Figures 4, 5:
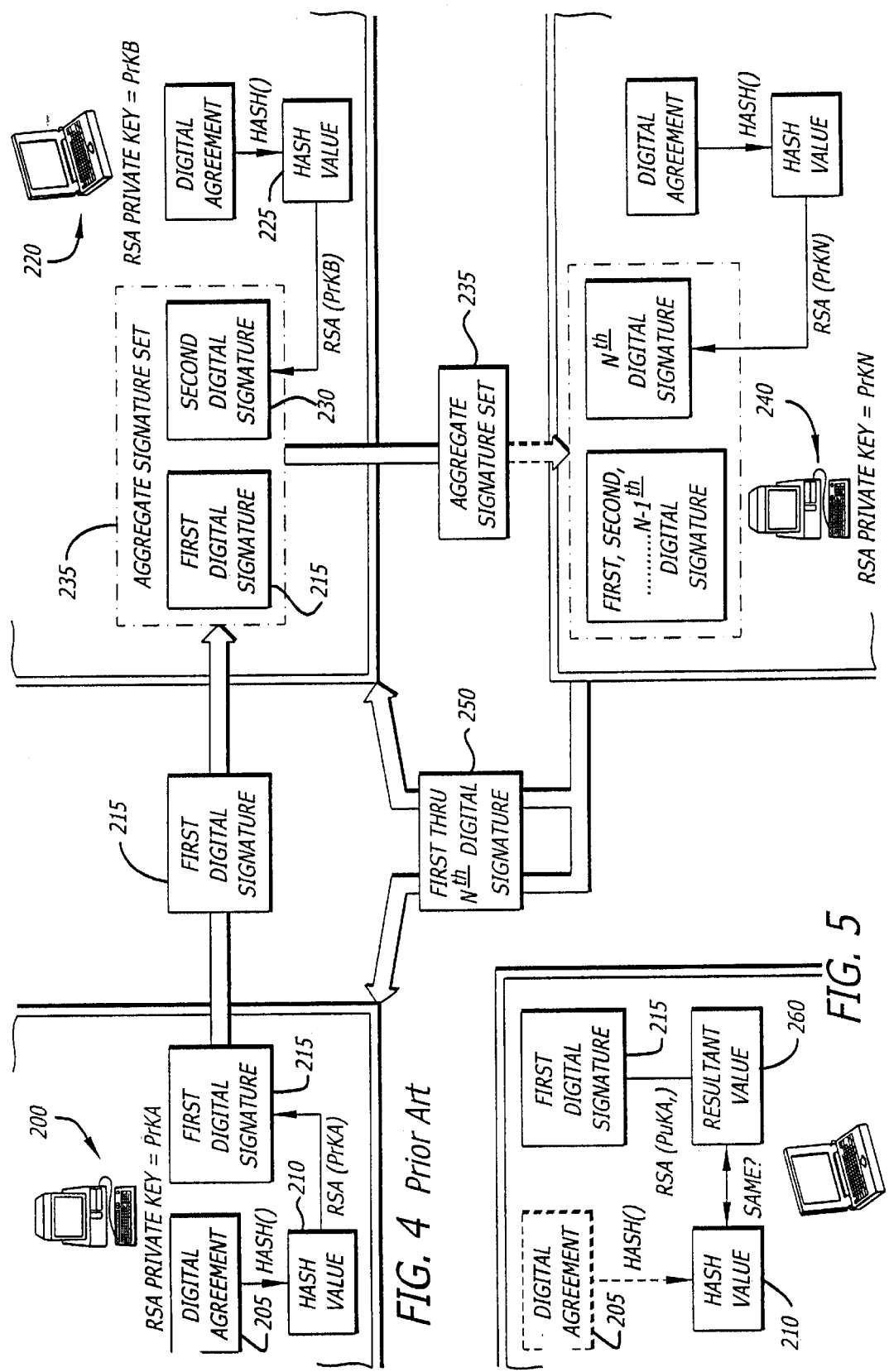
FIG. 4 is a block diagram of a conventional technique for digitally signing a digital agreement concerning two or more remotely located parties through the use of well-known cryptographic techniques.
FIG. 5 is a block diagram of a conventional technique used to verify whether a party has digitally signed the digital agreement.

For each individual message received from the various signatories in Step 735, the digital arbitrator performs the operations described in Step 740. These include (i) comparing the received digital agreement (or its acceptable alternative representation) against all versions of the agreement previously received, (ii) comparing the received signatory list against all versions of the signatory list previously received, and (iii) validating the digital signature using the public key of the signatory derived from the signatory list in the manner described for FIG. 5. As shown in Step 745, the arbitrator must successfully complete all of the operations in Step 740 for all signatories before proceeding.

If valid digital signatures are received from all signatories and all copies of the digital agreement and signatory list are identical, the agreement is deemed to have been fully executed and the arbitrator proceeds to Step 750. In Step 750, the arbitrator distributes an acknowledgment to each signatory indicating that the digital agreement has been fully signed. The digital agreement is contained in the arbitration node to be provided upon request by one of the signatories. Similarly, requests for a copy of the signatory list, or the set of signatures may be satisfied by the arbitration node. Alternatively, it is contemplated that the entire set of digital signatures associated with the digital agreement may be distributed with or without the use of the session key or asymmetric (public-private key) cryptography techniques.

The present invention described herein may be designed in many different methods and using many different configurations. For example, the present invention may be utilized by escrow companies or other financial institutions for arbitrating the exchange of wired monetary payments for records of title (e.g., deed). Another example would be the remote electronic mutual stipulation to a set of facts as might occur in a judiciary proceeding. Likewise, it could be used by any state or federal regulated entities (e.g., Department of Motor Vehicles). While the present invention has been described in terms of various embodiments, other embodiments may come to mind to those skilled in the art without departing from the spirit and scope of the present invention. The invention should, therefore, be measured in terms of the claims which follows.

What is claimed is:

1. A server comprising:
   a bus;
   a host processor coupled to the bus;
   a memory element coupled to the bus; and
   a cryptographic device coupled to the bus, the cryptographic device including
      a processing unit, and
      a memory element accessible by the processing unit, the memory element to store at least a public key, a private key and arbitration software which, when executed by the processing unit, determines whether each of a plurality of digitally signed messages is valid, and returns the plurality of digitally signed messages to each of a plurality of parties upon determining that each of the plurality of messages is valid, each of the plurality of digitally signed messages further includes a list of signatures associated with the digitally signed message and either (i) an electronic document, or (ii) a hash value of the cryptographic device.

2. The server according to claim 1, wherein the cryptographic device is dedicated to exclusively operate as control arbitration between the plurality of parties.

3. The server of claim 1, wherein the cryptographic device further comprises an internal random number generator contained within the package, the random number generator to generate information to produce the public key and the private key.

4. The server of claim 1, wherein the arbitration software of the cryptographic device is non-modifiable.

5. The server of claim 1, further comprising an input to receive the plurality of digitally signed messages from a plurality of signatory nodes corresponding to the plurality of parties.

6. The server of claim 1, wherein the arbitration software of the cryptographic device is non-modifiable by a user.

7. A server to arbitrate execution of a digital agreement involving a plurality of parties, the server comprising:
   a bus;
   a memory element coupled to the bus, the memory element containing software to respond to an authentication message and to arbitrate execution of the digital agreement; and
   a host processor coupled to the bus, the host processor executing the software to at least determine whether a plurality of digitally signed messages from the corresponding plurality of parties are valid and to provide the plurality of digitally signed messages to each of a plurality of parties when each of the plurality of messages is deemed to be valid, each of the plurality of digitally signed messages further includes a list of signatures associated with the digitally signed message and either (i) an electronic document, or (ii) a hash value of the cryptographic device.

8. The server of claim 7, further comprising a random number generator coupled to the bus.

9. A computer comprising:
   a memory element containing software to respond to an authentication message and to arbitrate execution of a digital agreement; and
   a processor coupled to the memory element, the processor executing the software to at least determine whether a plurality of digitally signed messages from a corresponding plurality of parties are valid and to provide the plurality of digitally signed messages to each of the plurality of parties when each of the plurality of messages is deemed to be valid, at least one of the plurality of digitally signed messages includes a list of signatories associated with the at least one digitally signed message.

10. The computer of claim 9, wherein the message includes either an electronic document or a hash value of the electronic document.

11. The computer of claim 9, further comprising a random number generator.

12. The computer of claim 9, wherein the processor is a general purpose microprocessor.

13. A method for digitally signing a digital agreement between a plurality of signatory nodes, comprising:
   receiving a query at an arbitration node by at least one signatory node, the query requesting information regarding a configuration of a cryptographic device situated in the arbitration node;
   receiving at the arbitration node a digital signature and a signatory list from each signatory node of the plurality of signatory nodes, each digital signature including a hash value of the digital agreement signed with a private key associated with its signatory node; and
   producing an acknowledgement for each signatory node of the plurality of signatory nodes upon confirmation that the digital agreement has been digitally signed by the plurality of signatory nodes.

14. The method of claim 13, wherein prior to producing the acknowledgement, the method comprises receiving a copy of the digital agreement.

15. The method of claim 14, wherein prior to producing the acknowledgement, the method comprises:

comparing the signatory lists from each of the plurality of signatory nodes;

if the signatory lists compare, recovering a hash value of the digital agreement for each digital signature provided by the plurality of signatory nodes using public keys associated with one of the signatory lists; and performing a hash operation on the copy of the digital agreement to produce a resultant hash value;

comparing the resultant hash value with a hash value recovered from each digital signature; and producing the acknowledgement if the resultant hash value matches each hash value recovered from the digital signatures.

* * * * *